United States Patent
Hardee et al.

(10) Patent No.: US 10,543,758 B2
(45) Date of Patent: Jan. 28, 2020

(54) REDUCTION OF UNWANTED MOTION IN VEHICLES

(71) Applicant: INTERNATIONAL BUSINESS MACHINES CORPORATION, Armonk, NY (US)

(72) Inventors: Christopher J. Hardee, Raleigh, NC (US); Maharaj Mukherjee, Poughkeepsie, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 64 days.

(21) Appl. No.: 15/209,941

(22) Filed: Jul. 14, 2016

(65) Prior Publication Data

US 2018/0015842 A1 Jan. 18, 2018

(51) Int. Cl.
*B60N 2/02* (2006.01)
*B60R 16/037* (2006.01)

(52) U.S. Cl.
CPC .................. *B60N 2/0244* (2013.01)

(58) Field of Classification Search
None
See application file for complete search history.

(56) References Cited

U.S. PATENT DOCUMENTS

| | | | | |
|---|---|---|---|---|
| 5,712,783 A * | 1/1998 | Catanzarite | .......... | B60G 17/015 180/378 |
| 6,596,976 B2 * | 7/2003 | Lin | .......... | F41G 3/145 244/3.15 |
| 7,437,219 B2 | 10/2008 | Bos | | |
| 7,490,572 B2 * | 2/2009 | Grober | .......... | B60R 11/04 114/191 |
| 7,543,792 B1 * | 6/2009 | Ursel | .......... | B60N 2/0232 248/550 |
| 2005/0159865 A1 * | 7/2005 | Bos | .......... | B60R 16/0232 701/39 |
| 2007/0213889 A1 * | 9/2007 | Parra Carque | .......... | G01C 3/08 701/7 |
| 2009/0002142 A1 * | 1/2009 | Morimoto | .......... | A61M 21/00 340/425.5 |
| 2015/0120149 A1 * | 4/2015 | Worrel | .......... | A61M 21/02 701/49 |
| 2017/0349061 A1 * | 12/2017 | Benson | .......... | B60N 2/0244 |

FOREIGN PATENT DOCUMENTS

CN  104972932 A  10/2015
JP  2002154350 A  5/2002

OTHER PUBLICATIONS

L. Bruzzone, R.M. Molfino, "Special-purpose parallel robot for active suspension of ambulance stretchers", International Journal of Robotics and Automation, vol. 18, N° 3, 2003, pp. 121-130 (Year: 2003).*

Arslan et al., "Improving the ride comfort of vehicle passenger using fuzzy sliding mode controller," Journal of Vibration and Control, vol. 21, No. 9, 2015 (13 pages).

* cited by examiner

*Primary Examiner* — Todd M Melton
*Assistant Examiner* — Jason R Roberson
(74) *Attorney, Agent, or Firm* — Griffiths & Seaton PLLC

(57) ABSTRACT

Embodiments for reducing unwanted motion experienced by an occupant of a vehicle by a processor. In response to an anticipated movement of the vehicle, a motion of a seating surface of the vehicle is caused to at least partially compensate for the anticipated movement of the vehicle.

12 Claims, 8 Drawing Sheets

REDUCTION OF UNWANTED MOTION IN VEHICLES

BACKGROUND OF THE INVENTION

Field of the Invention

The present invention relates in general to computing systems, and more particularly, to various embodiments for reducing unwanted motion of passengers and goods in moving vehicles, such as an automated driverless motor vehicle.

Description of the Related Art

Vehicles of every kind, size, energy consumption, and more currently driven or so called "driverless vehicles" are prevalent in every aspect of today's society, as people are more mobile today than likely at any time in recorded history. Attendant with the proliferation of vehicles have been certain negative impacts associated with being an occupant in a moving object. One of these negative impacts is motion sickness, where an individual feels negative health effects, such as nausea, dizziness, loss of alertness, and other health and well-being impacts from the effects of the vehicle's motion.

As the complexity of areas traveled by vehicles increases (such as an increased number of other vehicles and obstacles on the road to avoid), as well as the advent of driverless vehicles, where control of the vehicle is turned over to a computer driven source, the health issues relating to motion sickness will continue to increase.

SUMMARY OF THE INVENTION

Various embodiments for reducing unwanted motion experienced by an occupant of a vehicle, are provided. In one embodiment, by way of example only, a method for reducing unwanted motion experienced by an occupant of a vehicle, again by a processor, is provided. In response to an anticipated movement of the vehicle, a motion of a seating surface of the vehicle is caused to at least partially compensate for the anticipated movement of the vehicle.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
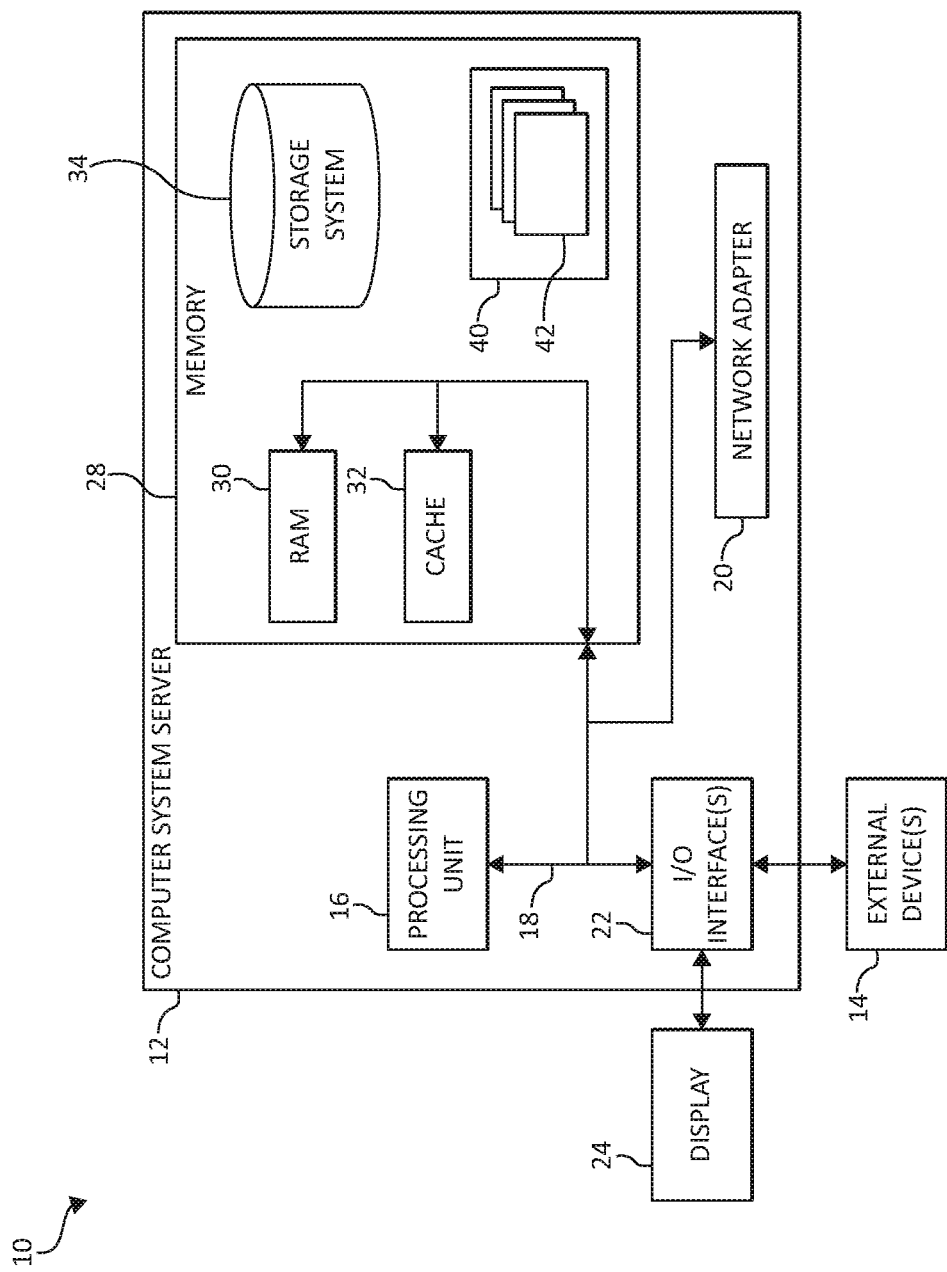
FIG. 1 is a block diagram depicting an exemplary computing node according to an embodiment of the present invention.

As previously indicated, use of vehicles for mobility of persons, animals (e.g., pets) and the like are increasingly proliferating. Motion sickness continues to be a challenge for some individuals when unwanted motion of the vehicle is experienced, and may continue to proliferate as driverless and other similar autonomous vehicles become more commonplace, as many occupants will surrender some or all control of the vehicle to an external source, thereby not directly experiencing the cause and effect relationships that may occur between motion of the vehicle and awareness of the outside environment.

For example, consider the following scenario in a driverless vehicle. One of the benefits cast to driverless vehicles is the ability for the occupant(s) to not have to focus on driving, and allowing the occupants the ability to focus on other tasks, such as work, or conversation with another person on the phone, and so forth. Accordingly, the former driver is now in the trust of the computer to avoid obstacles, for example, and otherwise safely navigate the vehicle to its intended destination.

In a common scenario, however, the vehicle may sense an obstacle in its path, such as a pothole, or another obstruction, and may make an attempt to avoid the obstacle or, for example, steer around the obstruction. The movement of the vehicle to avoid the obstacle may result in sudden, abrupt changes in the motion of the vehicle, which are passed directly through the seating surface of the vehicle to the occupant. These sudden and abrupt changes may affect the occupant negatively, as the occupant has not been paying close attention to the outside surroundings and is unaware of the attempts needed to place the vehicle in a safe position. The disconnect of the occupant between this cause and effect of the motion of the vehicle may directly contribute to additional motion sickness on the part of the occupant.

Notwithstanding the foregoing example, sudden, unwanted movements of a vehicle may be problematic to any occupant of any vehicle, and not limited to autonomous vehicles. For example, passengers in typical driven vehicles may also not be able to, or not interested in, paying close attention to outside information, and again may separate cause and effect experienced with sudden movements of the vehicle, leading again to the negative health effects previously described.

In view of the foregoing, a need exists for mechanisms whereby the unwanted movement of an occupant in a moving vehicle may be addressed, such that the overall motion of the occupant is reduced and/or eliminated in an effort to reduce motion sickness and other negative health effects, particularly as applied in autonomous vehicles, but applicable in any moving vehicle (such as a train, bus, or even airplane).

To address these needs, the mechanisms of the present invention use various means as will be further described to perform what will be termed herein as "movement anticipation," or anticipating the movement of a moving vehicle at an instant in time. The movement anticipation process may take into account data from a variety of stored and real time sources, such as maps, traffic alerts, current street conditions, and data gathered from the current motion of the vehicle from various integrated sensor devices, among other sources.

Once the movement of the vehicle is anticipated, the mechanisms of the illustrated embodiments then may compensate for the unwanted motion in various ways. For example, the mechanisms of the present invention may "dampen" the motion of the vehicle by causing a seating surface of an occupant to move in a slower manner, or even opposite to, the current force acting on the seating surface to counteract the acting force. Various embodiments to slow the motion of the occupant, or otherwise attempt to counteract the unwanted motion of the vehicle, will be further described, following.

In addition to compensating for the unwanted motion of the vehicle, the mechanisms of the illustrated embodiments may incorporate real time feedback, here again obtained from the vehicle and/or its occupant(s) from a variety of data sources. For example, the feedback obtained may include biometric information measured from the occupant as will be further described. In this way, the feedback information may also be used to vary the motion of the seating surface of the vehicle until the mechanisms of the illustrated embodiments make a determination that the occupant has become more comfortable. Additional aspects of the present invention and attendant benefits will be further described, following.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

In the context of the present invention, and as one of skill in the art will appreciate, various components depicted in FIG. 1 may be located in a moving vehicle. For example, some of the processing and data storage capabilities associated with mechanisms of the illustrated embodiments may take place locally via local processing components, while the same components are connected via a network to remotely located, distributed computing data processing and storage components to accomplish various purposes of the present invention. Again, as will be appreciated by one of ordinary skill in the art, the present illustration is intended to convey only a subset of what may be an entire connected network of distributed computing components that accomplish various inventive aspects collectively.

Figure 2:
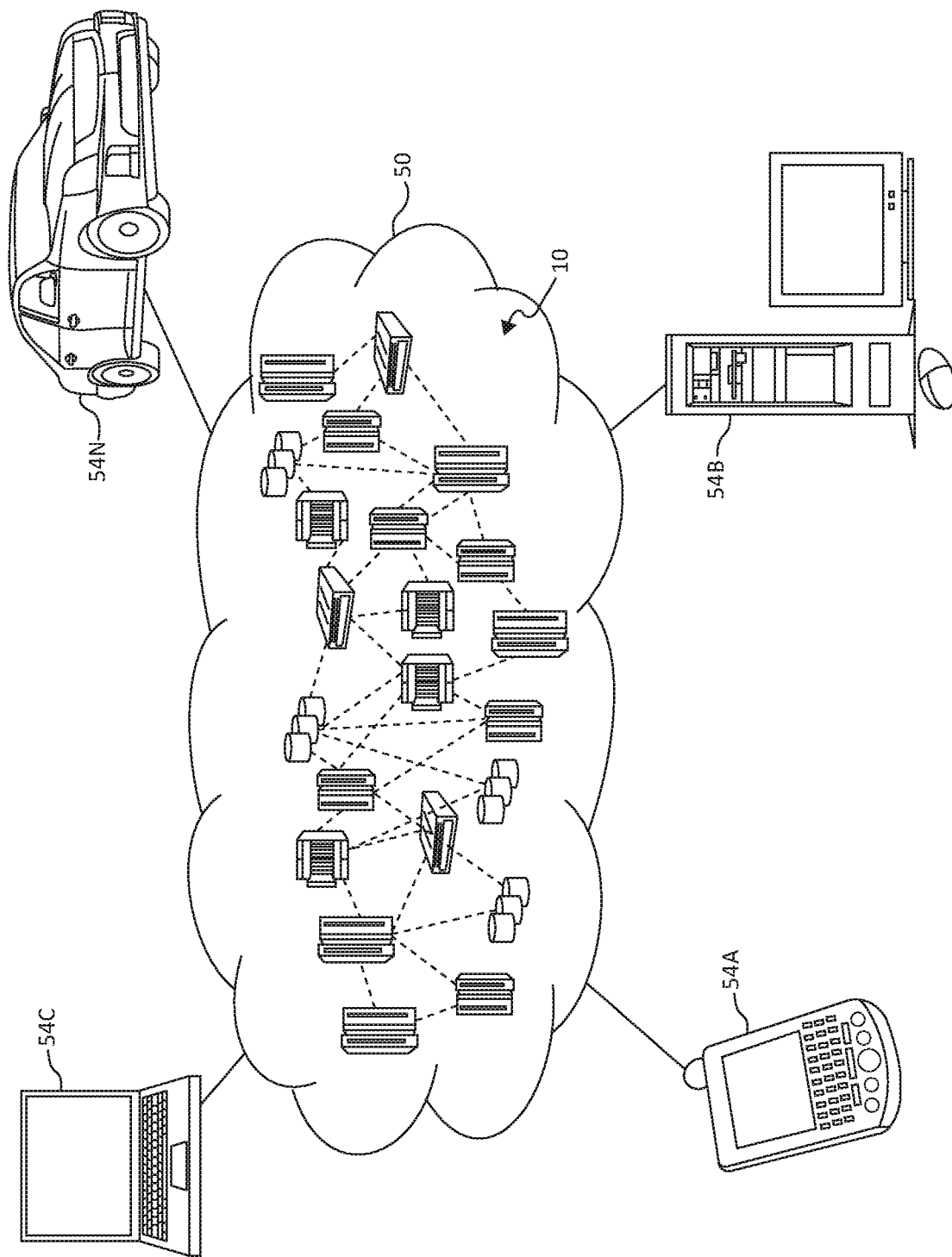
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
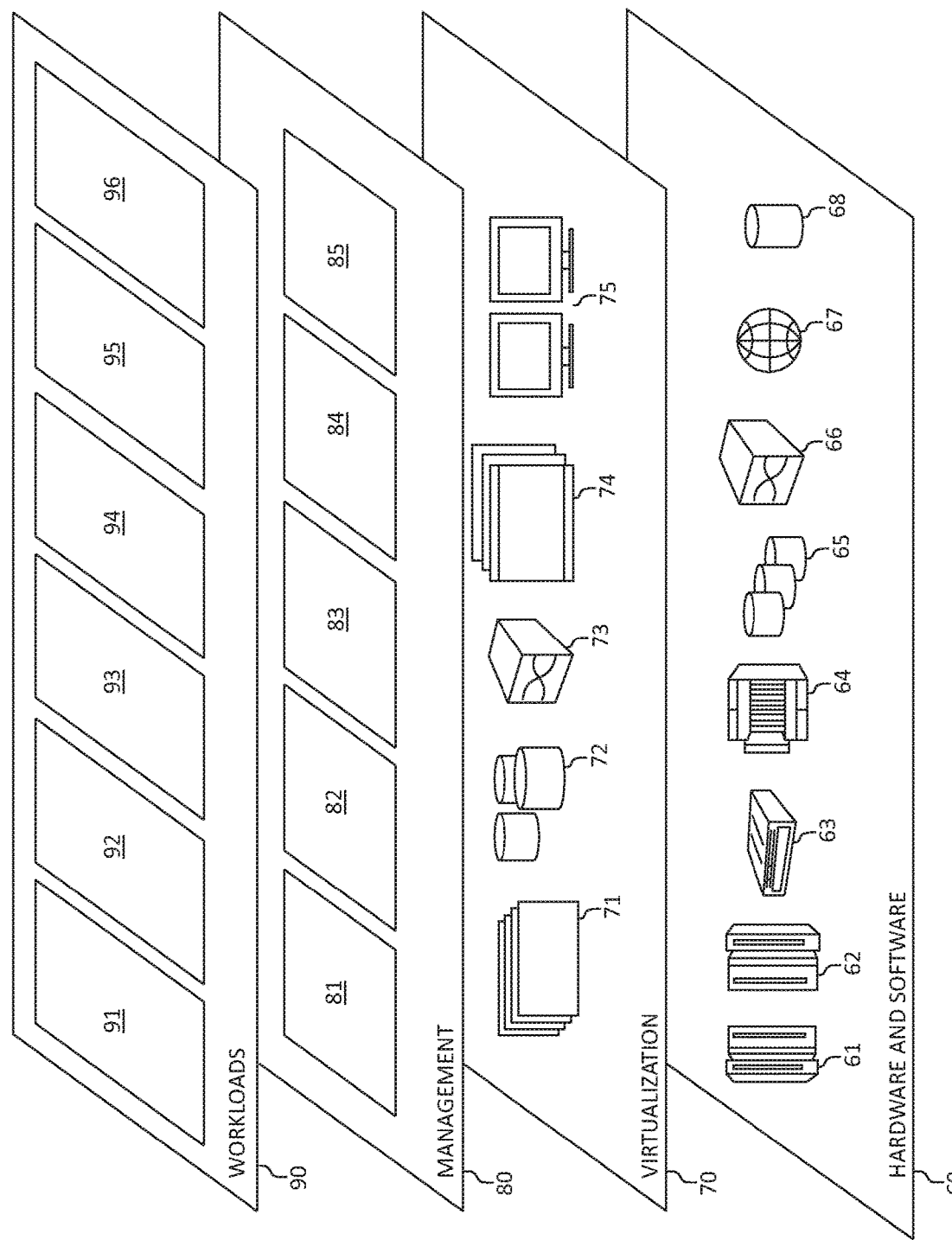
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various motion anticipation and actuation workloads and functions 96. In addition, motion anticipation and actuation workloads and functions 96 may include such operations as data analysis (including data collection and processing from various sensors). One of ordinary skill in the art will appreciate that the image processing workloads and functions 96 may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously mentioned, the mechanisms of the illustrated embodiments provide novel approaches for the reduction of unwanted motion in moving vehicles as will be further described. The mechanisms include a data collection aspect, where a variety of information may be collected about the position, speed, acceleration (or deceleration), and other aspects of the moving vehicle at a point in time. The various data collection activities may take place using road information (e.g., maps), traffic information (e.g., traffic events, alerts, and the like), or by use of onboard vehicle information (e.g., speed, acceleration, position information, and the like).

In addition, the data collection aspect as will be described may include various data collection activities associated with one or more occupants of the vehicle to make determinations as to the occupant's current level of comfort, and based on real time feedback, whether the occupant's comfort has improved after various adjustments. These determinations may, in part, be obtained by using biometric information from the occupant(s) such as facial expressions, body temperature, breathing, other visual and auditory cues, heart rate, and so forth.

In one embodiment, the mechanisms of the illustrated embodiments may implement a smoothing filter, where an input signal representative of the current motion and/or anticipated motion the motor vehicle will experience is passed. The output of the smoothing filter is then used to actuate the seating surfaces of the occupant, so that, for example, an anticipated sudden jolt in movement may be reduced to a smoother motion that is more tolerable to the occupant.

Figure 4:
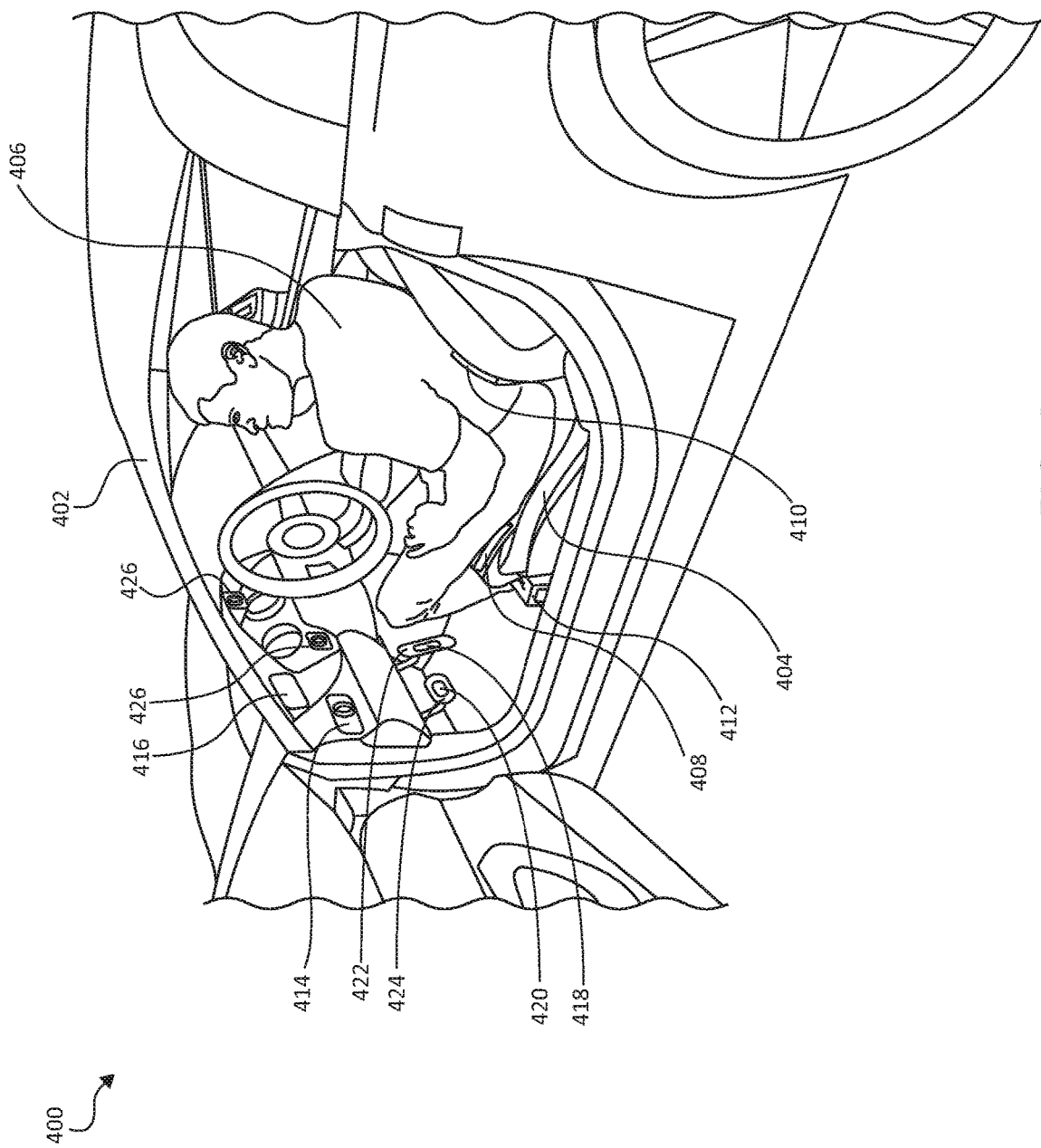
FIG. 4 is an additional block diagram depicting various user hardware and computing components functioning in accordance with aspects of the present invention.

Turning now to FIG. 4, a block diagram of exemplary computing, data processing, sensory, data storage, and other components 400 are shown in the context of a moving vehicle 402, in which various aspects of the present invention may be implemented. The various components 400 may work together in concert to reduce unwanted motion of the motor vehicle and thereby reduce motion sickness and other deleterious effects of the unwanted motion.

The vehicle 402 includes a seating surface 404 in which the occupant 406 is seated as shown. The seating surface 404 incorporates a number of sensory devices, such as sensors 408 and 410, which may be configured to record such biometric information as body temperature of the occupant, heart rate, breathing, or other biometric information.

An actuator 412 is coupled to the seating surface 404 as shown. As one of ordinary skill in the art will appreciate, the actuator 412 may incorporate a number of components, such as a motor(s) that allow movement of the seating surface 404 in an X, Y, and Z-axis direction in space, dampening devices such as springs or cushioning devices, and other components.

The vehicle 402 may also be equipped with additional sensor devices to determine the vehicle's position, acceleration, deceleration, velocity, and other data. For example, device 414 may include such devices as a gyroscope 414, or an accelerometer 414. Similarly, device 416 may include a Global Positioning System (GPS) monitoring device. Of course, the gyroscope 414, accelerometer 414 and GPS 416 are merely illustrative of what may be a wide variety of data input devices selected to provide information concerning the motor vehicle's position in space, direction traveled, obstacles to be encountered, road conditions, weather conditions, and so forth.

In addition to the sensors 414 and 416, the vehicle 402 is also equipped with sensors 418 and 420, which are in communication (mechanical and/or electrical) with the vehicle 402's acceleration 422 and brake 424 pedals. Various cameras 426 may also be installed in the vehicle 402 to obtain data, such as visual cameras 426, infrared cameras 426, or even microphones 426 and other biometric devices to record temperature, facial expressions, auditory information, and other cues as to the comfort of the occupant 406.

Finally, a representation of a computer system/server 12 is shown for illustrative purposes, to indicate that each of the sensors 408, 410, 414, 416, 418, 420, actuator 412, cameras/microphones 426, and other data collection devices not shown for purposes of illustrative convenience may be in communication with the computer system/server 12 to effect data processing, data collection, computational, and other tasks. Computer system/server 12 may incorporate onboard data storage capabilities, storing map information, road conditions, travel alert information, and the like. In addition, and as previously indicated, computer system/server 12 may be connected to other computing nodes over a distributed computing network, where additional data collection, processing, analytics, and other functionality may be realized.

As previously mentioned, the mechanisms of the illustrative embodiments may, through the use of various hardware and software (such as portions of the components 400, or the various other hardware and software components previously described), effect what will be termed herein as a "motion anticipator and calculator" functionality. The motion anticipator and calculator may then function to anticipate changes in motion based on a plurality and combination thereof of data collected from the various data sources, such as data obtained by route observation (e.g., changes in terrain, curves in the roadway), current traffic data from a variety of data sources, historical data collected for each stretch of the route, including the roughness of the road, and other data.

In one embodiment, the motion anticipator and calculator may calculate the current forces acting on the vehicle at an instant in time, such as acceleration, velocity, and centrifugal force on the vehicle. This data may, as previously described, be obtained from instruments such as gyroscopes, sensor information from the accelerator and brake pedals, accelerometers, and other devices.

Figure 5:
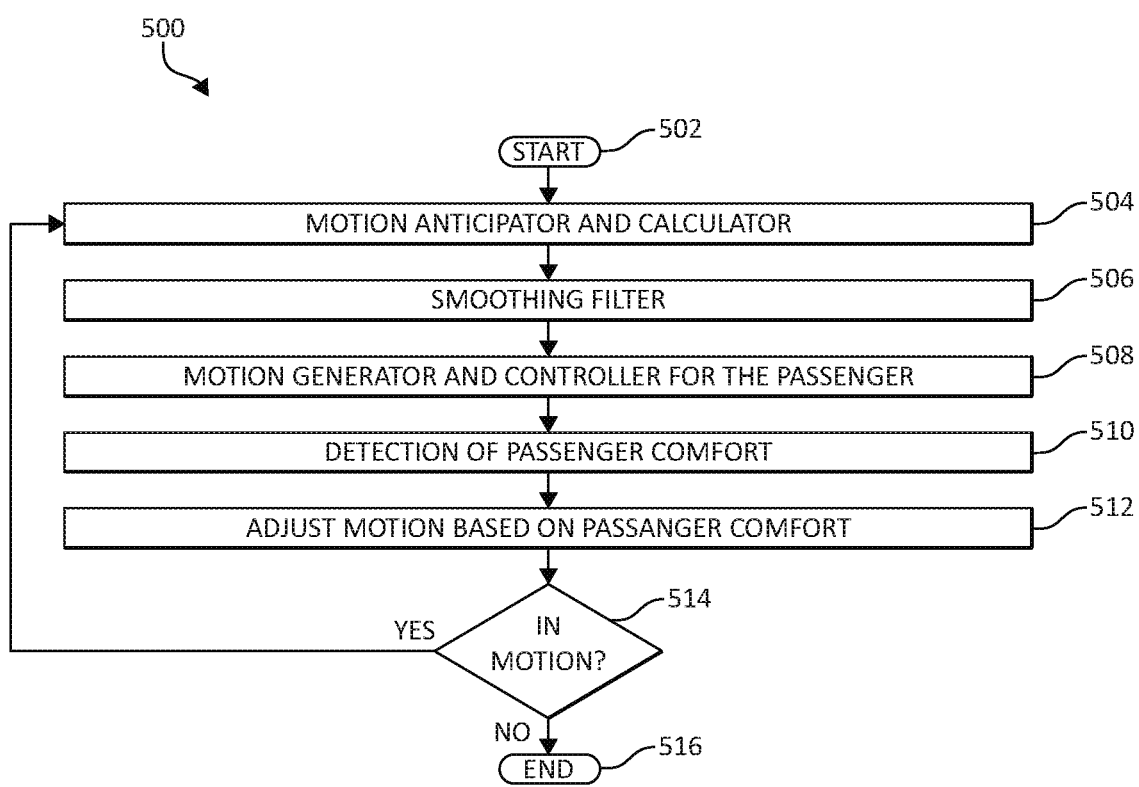
FIG. 5 is a flowchart diagram depicting various aspects of the present invention in process flow.

Turning to FIG. 5, a flowchart diagram of an exemplary method 500 for reducing unwanted motion in a vehicle in accordance with various aspects of the present invention, is illustrated. Method 500 begins (step 502), with the functionality just described of the motion anticipator and calculator function of collecting various data points, calculating the current motion of the vehicle, and anticipating future motion of the vehicle (step 504). The output from the motion anticipator and calculator is supplied to a smoothing filter, as will be further described, which in one embodiment, acts to lessen sudden movements (e.g., sudden changes in direction, acceleration, deceleration, and the like) (step 506). The output from the smoothing filter is then supplied to a motion generator and controller (i.e., actuator), which generates motion to counteract the anticipated motion, and/or dampens the forces applied to the seating surface at any instant in time (step 508).

Through various input devices, such as the aforementioned biometric sensors, cameras, microphones, and other data inputs, the mechanisms of the illustrated embodiments then detect a current level of occupant comfort in step 510, following. This detection may be based, for example, by comparing current observations of the occupant with recorded historical averages of that particular individual, or by comparing certain biometric data against a predetermined threshold.

If, through the comfort detection process, method 500 determines that occupant comfort may be improved, a feedback mechanism then imparts corrective action to the motion generator and controller function, for example, to improve occupant comfort (step 512). If, in decision step 514, the method 500 determines that the vehicle continues to be in motion, the method 500 returns to step 504 to continue motion anticipation functions, and the method 500 continues as depicted. Returning to step 514, if the vehicle has reached its destination, the method 500 then ends (step 516).

Figure 6A:
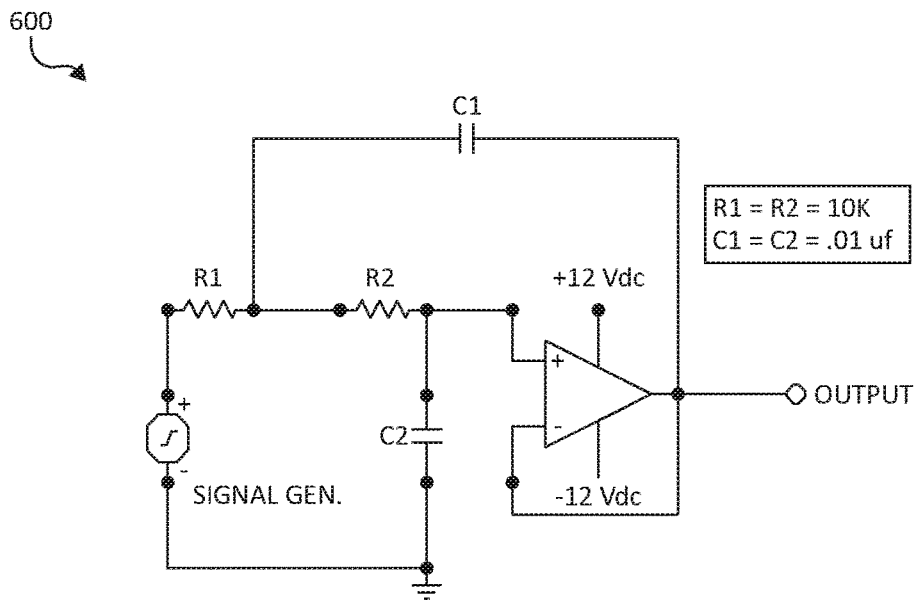
FIG. 6A is an additional block diagram depicting an exemplary active lowpass filter to be utilized in various aspects of the illustrated embodiments.

Turning now to FIG. 6A, an exemplary smoothing filter 600 is depicted, which may function according to the mechanisms of the illustrated embodiments to dampen sudden changes in movement as previously described. While one of ordinary skill in the art will appreciate that the smoothing filter 600 depicted is an active lowpass filter, it may be appreciated that a wide variety of filters of varying types, such as analog or digital or a combination thereof, may be applied (in hardware, modeled in software, or a combination thereof, for example) to one or more input signals obtained from the output of the motion anticipator function.

For example, in one embodiment, a number of individual smoothing filter modules may be used in specific aspects of the vehicle's calculated motion, such as application of a filter to anticipated motion in an X direction, application of an additional filter to anticipated motion in a Y direction, and application of still an additional filter to anticipated motion in a Z direction. The combination of the individual filters may be summed at the actuator, for example.

Figure 6B:
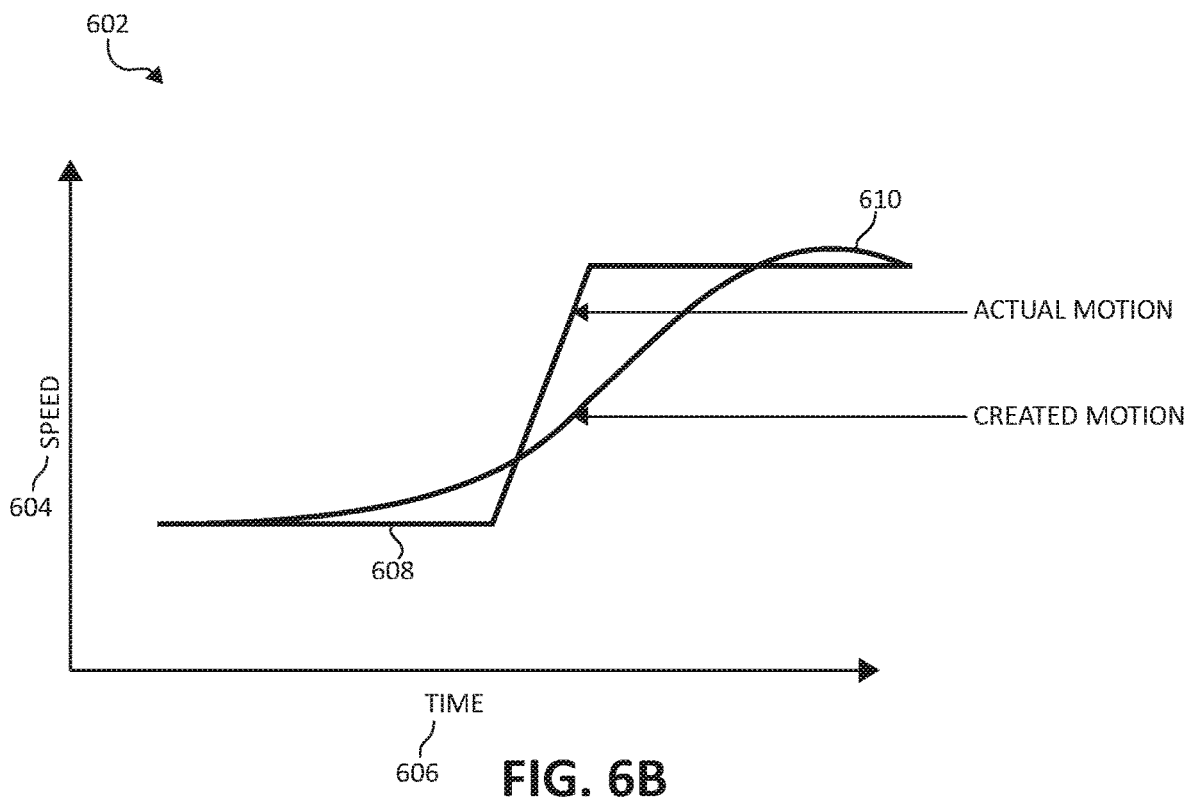
FIG. 6B is a line graph diagram depicting anticipated/actual motion of a vehicle and an exemplary motion created to compensate for the actual motion, in accordance with various aspects of the present invention.

FIG. 6B, following, illustrates graphically the impact of application of one or more smoothing filter modules to an input signal representative of actual/anticipated motion in chart 602. Speed of the vehicle is shown in the y-axis 604, while elapsed time is shown in the x-axis 606. An actual motion (line 608) demonstrates an abrupt change in speed over a certain time (sudden acceleration, for example), while application of the smoothing filtering functionality reduces the abruptness of the "created" motion of the actuator to a smooth curve 610 as shown, which has a gradual slope to a peak and then small decline in magnitude. The created motion curve 610 will be more palatable to the occupant of the vehicle, as even a short trip may be characterized by dozens of abrupt changes in motion in the vehicle that may translate into an increased propensity of the occupant to develop motion sickness.

Figure 7:
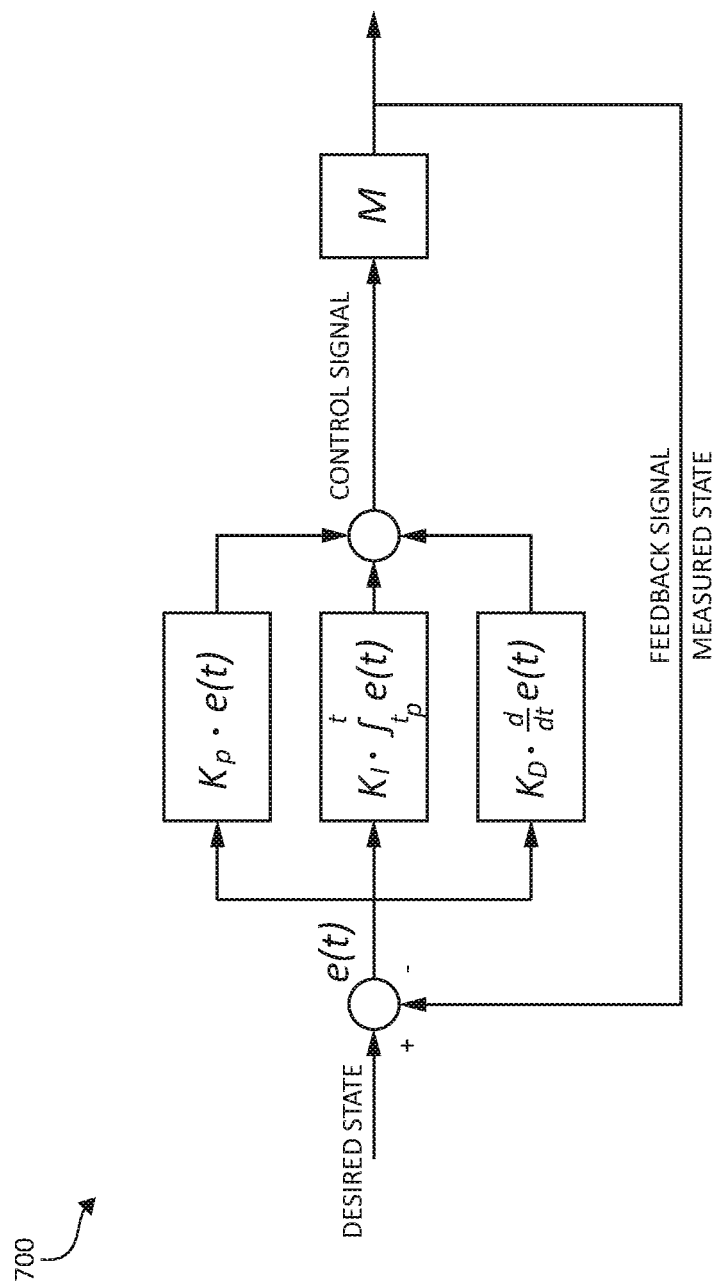
FIG. 7 is an additional block diagram depicting a state diagram of an exemplary Proportional-Integration-Derivative (PID) controller to be utilized in various aspects of the illustrated embodiments.

FIG. 7, following, illustrates one embodiment of a feedback mechanism to adjust created motion of the actuator to better harmonize occupant comfort in the vehicle as a Proportional-Integration-Derivative (PID) state diagram, that may be implemented into a controller device 700. As one of ordinary skill in the art will appreciate, the PID controller acts to reach a desired state by sampling a control signal, and feeding the signal back to reduce undesired effects. In this way, the PID controller 700 continuously calculates an error value as the difference between a desired setpoint and a measured process variable. The controller 700 attempts to minimize the error over time by adjustment of a control variable (e.g., motion supplied to the seating surface by the actuator along an axis of movement).

In the context of the mechanisms of the illustrated embodiments, and as previously described, the PID controller(s) may leverage a variety of data measured at the occupant, such as biometric information and other visual, auditory, and similar cues as to the occupant's comfort level, and adjust the control signal(s) as necessary to increase occupant comfort. For example, the mechanisms of the illustrated embodiments may determine a historical threshold for a certain individual for unwanted motion that is greater than another individual, and adjust the dampening and other actuation occurring on the individual's seating surface to commensurate with her desired comfort level.

Figure 8:
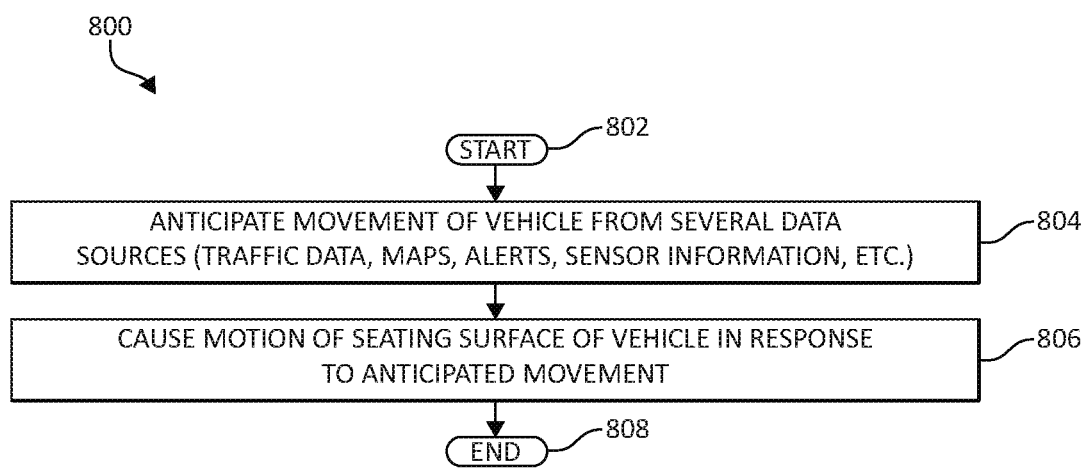
FIG. 8 is an additional flowchart diagram depicting an exemplary method for reducing unwanted motion experienced by an occupant in a vehicle, again in which various aspects of the present invention may be implemented.

FIG. 8, following, is an additional flowchart diagram of an exemplary method 800 for reducing unwanted motion in a vehicle to improve occupant comfort, in accordance with various aspects of the present invention. Method 800 begins (step 802) by anticipating movement of the vehicle using a variety of data sources (external, internal, sensory, etc.) (step 804). In response to the anticipated motion, the seating surface of the vehicle is caused to move to at least partially compensate for the anticipated motion (step 806). The method 800 then ends (step 810).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method, by a processor, for reducing unwanted motion experienced by an occupant of a vehicle, comprising:
    in response to an anticipated movement of the vehicle, causing a motion of a seating surface of the vehicle to at least partially compensate for the anticipated movement of the vehicle;
    passing an output of a motion anticipator through a smoothing filter;
    providing an output of the smoothing filter to an actuator instructed to cause the motion of the seating surface in accordance with the output of the smoothing filter; wherein the smoothing filter further includes an application of a first filter to anticipated motion in an X direction, an application of a second filter to anticipated motion in a Y direction, and an application of a third filter to anticipated motion in a Z direction; wherein a combination of the first, second, and third filters are summed at a controller of the actuator; and wherein the actuator further includes a plurality of motors used to cause the motion of the seating surface according to the output of the smoothing filter received by the controller of the actuator; and
    imparting a real time adjustment in the motion of the seating surface of the vehicle based on a feedback signal measured at the seating surface and within a cabin of the vehicle; wherein the feedback signal is obtained as a function of biometric information including facial expressions and auditory cues surveyed from the occupant of the vehicle as recorded by biometric sensors integrated into the seating surface and the cabin.

2. The method of claim 1, further including causing the motion of the seating surface of the vehicle to occur more slowly than an anticipated rate of change of the anticipated movement of the vehicle.

3. The method of claim 1, further including causing the motion of the seating surface to impart an opposing force approximately equal to an anticipated acting force caused by the anticipated movement of the vehicle.

4. The method of claim 1, further including anticipating the movement of the vehicle using data obtained from a stored repository, or data obtained in real time from sensor based devices associated with the vehicle.

5. A system for reducing unwanted motion experienced by an occupant of a vehicle, comprising:
    a processor, that:
        in response to an anticipated movement of the vehicle, causes a motion of a seating surface of the vehicle to at least partially compensate for the anticipated movement of the vehicle;
        passes an output of a motion anticipator through a smoothing filter;
        provides an output of the smoothing filter to an actuator instructed to cause the motion of the seating surface in accordance with the output of the smoothing filter; wherein the smoothing filter further includes an application of a first filter to anticipated motion in an X direction, an application of a second filter to anticipated motion in a Y direction, and an application of a third filter to anticipated motion in a Z direction; wherein a combination of the first, second, and third filters are summed at a controller of the actuator; and wherein the actuator further includes a plurality of motors used to cause the motion of the seating surface according to the output of the smoothing filter received by the controller of the actuator; and
        imparts a real time adjustment in the motion of the seating surface of the vehicle based on a feedback signal measured at the seating surface and within a cabin of the vehicle; wherein the feedback signal is obtained as a function of biometric information including facial expressions and auditory cues surveyed from the occupant of the vehicle as recorded by biometric sensors integrated into the seating surface and the cabin.

6. The system of claim 5, wherein the processor causes the motion of the seating surface of the vehicle to occur more slowly than an anticipated rate of change of the anticipated movement of the vehicle.

7. The system of claim 5, wherein the processor causes the motion of the seating surface to impart an opposing force approximately equal to an anticipated acting force caused by the anticipated movement of the vehicle.

8. The system of claim 5, wherein the processor anticipates the movement of the vehicle using data obtained from a stored repository, or data obtained in real time from sensor based devices associated with the vehicle.

9. A computer program product for reducing unwanted motion experienced by an occupant of a vehicle by a processor, the computer program product comprising a non-transitory computer-readable storage medium having computer-readable program code portions stored therein, the computer-readable program code portions comprising:
    an executable portion, that in response to an anticipated movement of the vehicle, causes a motion of a seating surface of the vehicle to at least partially compensate for the anticipated movement of the vehicle;
    an executable portion that passes an output of a motion anticipator through a smoothing filter;
    an executable portion that provides an output of the smoothing filter to an actuator instructed to cause the motion of the seating surface in accordance with the output of the smoothing filter; wherein the smoothing filter further includes an application of a first filter to anticipated motion in an X direction, an application of a second filter to anticipated motion in a Y direction, and an application of a third filter to anticipated motion in a Z direction; wherein a combination of the first, second, and third filters are summed at a controller of the actuator; and wherein the actuator further includes a plurality of motors used to cause the motion of the seating surface according to the output of the smoothing filter received by the controller of the actuator; and
    an executable portion that imparts a real time adjustment in the motion of the seating surface of the vehicle based on a feedback signal measured at the seating surface and within a cabin of the vehicle; wherein the feedback signal is obtained as a function of biometric information including facial expressions and auditory cues surveyed from the occupant of the vehicle as recorded by biometric sensors integrated into the seating surface and the cabin.

10. The computer program product of claim 9, further including an executable portion that causes the motion of the seating surface of the vehicle to occur more slowly than an anticipated rate of change of the anticipated movement of the vehicle.

11. The computer program product of claim 9, further including an executable portion that causes the motion of the seating surface to impart an opposing force approximately equal to an anticipated acting force caused by the anticipated movement of the vehicle.

12. The computer program product of claim 9, further including an executable portion that anticipates the movement of the vehicle using data obtained from a stored repository, or data obtained in real time from sensor based devices associated with the vehicle.

* * * * *